US009040638B2

(12) United States Patent
Piccirilli et al.

(10) Patent No.: US 9,040,638 B2
(45) Date of Patent: May 26, 2015

(54) USE OF HYDROXYCARBOXYLIC ACID OLIGOMERS AS ADHESIVES, MANUFACTURING METHOD AND HYDROXYCARBOXYLIC ACID OLIGOMERS OBTAINED

(75) Inventors: Antoine Piccirilli, Poitiers (FR); Cedric Dever, Jaunay-Clan (FR)

(73) Assignee: Valagro Carbone Renouvelable Poitou-Charentes, Poitiers (FR)

( * ) Notice: Subject to any disclaimer, the term of this patent is extended or adjusted under 35 U.S.C. 154(b) by 271 days.

(21) Appl. No.: 13/503,882

(22) PCT Filed: Oct. 27, 2010

(86) PCT No.: PCT/FR2010/052304
§ 371 (c)(1),
(2), (4) Date: Apr. 25, 2012

(87) PCT Pub. No.: WO2011/051623
PCT Pub. Date: May 5, 2011

(65) Prior Publication Data
US 2012/0219709 A1    Aug. 30, 2012

(30) Foreign Application Priority Data

Oct. 30, 2009 (FR) .................................... 09 57647

(51) Int. Cl.
*C08G 63/00* (2006.01)
*C09J 167/04* (2006.01)
*C08G 18/42* (2006.01)
*C08G 63/06* (2006.01)
*C09J 175/06* (2006.01)

(52) U.S. Cl.
CPC ........... *C09J 167/04* (2013.01); *C08G 18/4283* (2013.01); *C08G 63/06* (2013.01); *C08G 2230/00* (2013.01); *C09J 175/06* (2013.01)

(58) Field of Classification Search
None
See application file for complete search history.

(56) References Cited

U.S. PATENT DOCUMENTS

| | | | | | |
|---|---|---|---|---|---|
| 3,284,417 | A | * | 11/1966 | Hostettler et al. | 528/357 |
| 3,760,034 | A | * | 9/1973 | Critchfield et al. | 525/412 |
| 3,764,365 | A | * | 10/1973 | Duncan et al. | 428/90 |
| 4,156,676 | A | * | 5/1979 | Bacskai | 524/493 |
| 5,502,158 | A | * | 3/1996 | Sinclair et al. | 528/354 |
| 2004/0161464 | A1 | * | 8/2004 | Domb | 424/486 |
| 2007/0036855 | A1 | * | 2/2007 | Domb et al. | 424/468 |

FOREIGN PATENT DOCUMENTS

| | | | |
|---|---|---|---|
| EP | 0 899 274 | 3/1999 | |
| JP | 11060716 | 3/1999 | |
| WO | 95/10577 | 4/1995 | |
| WO | 98/35631 | 8/1998 | |
| WO | WO 98/35631 | * 8/1998 | ............... A61F 2/00 |
| WO | WO 9835631 | * 9/1998 | ............... A61F 2/00 |
| WO | 02/34857 | 5/2002 | |

OTHER PUBLICATIONS

International Search Report dated Mar. 17, 2011, corresponding to PCT/FR2010/052304.
Translation of Japanese Office Action, dated Jun. 17, 2014, corresponding to FR 0957647, JP 2012-535904.

* cited by examiner

*Primary Examiner* — Yate K Cutliff
(74) *Attorney, Agent, or Firm* — Young & Thompson

(57) ABSTRACT

Disclosed is a method of using at least one functionalized hydroxycarboxylic acid oligomer as an adhesive for bonding materials. Also described is a process for manufacturing functionalized hydroxycarboxylic acid oligomers including at least one stage for polycondenzation of a hydroxycarboxylic acid and a functional agent, as well as functionalized hydroxycarboxylic acid oligomers that can be obtained and the adhesive compositions that include them.

19 Claims, No Drawings

USE OF HYDROXYCARBOXYLIC ACID OLIGOMERS AS ADHESIVES, MANUFACTURING METHOD AND HYDROXYCARBOXYLIC ACID OLIGOMERS OBTAINED

This invention relates to the use of at least one particular biodegradable hydroxycarboxylic acid oligomer as an adhesive.

The invention also relates to a process for manufacturing biodegradable hydroxycarboxylic acid oligomers as well as particular products that are obtained by the implementation of this process and the adhesive compositions that integrate them.

An adhesive is defined as a product that can hold materials by adhesion. Virtually all of the materials can be assembled by bonding according to a 3-stage process: application of the adhesive on the surface of at least one of the materials to be bonded, brought into contact with materials, and drying or hardening of the adhesive.

There are numerous products that are known and used for their adhesion properties. These synthetic-based products can be classified in two large families:

The reactive adhesives whose hardening corresponds to a chemical reaction and that are heat-hardening, such as phenol compounds, epoxide compounds, polyurethanes, etc., and The physical adhesives whose hardening corresponds to a change in the physical state (from the liquid state to the solid state) such as the solvent-containing products or the thermosetting products like polyesters or ethylene-vinyl acetate copolymers.

These adhesives are widely used because they have excellent bonding properties and can be produced in an industrial quantity at low cost.

However, these known products have significant drawbacks because they are of petrochemical origin and are non-renewable and non-biodegradable. The ultimate result therefore is an adhesive that is not good for the environment and that does not break down entirely.

There is therefore a need for an effective adhesive that has good properties, able to be produced in an industrial quantity at low cost, which is also good for the environment, in particular obtained from natural and biodegradable resources.

This is the purpose of this invention in proposing to use a functionalized oligomer of biodegradable hydroxycarboxylic acid as adhesive. The functionalized hydroxycarboxylic acid oligomer is obtained by at least one stage for polycondensation of a hydroxycarboxylic acid and a functional agent that is derived from an oil or a fat of natural origin.

Actually, surprisingly enough, these particular functionalized hydroxycarboxylic acid oligomers have noteworthy properties as adhesives.

"Hydroxycarboxylic acid oligomer" is defined as a molecule that consists of a finite number of hydroxycarboxylic acid monomers (from 1 to 1,000) that are coupled or cross-linked together in a covalent manner.

In terms of the invention, functionalized oligomer is defined as an oligomer that is obtained by condensation of several hydroxycarboxylic acid monomers on themselves and for which a portion or all of the hydroxyl groups has/have been replaced by other groups.

Esterified oligomer is defined as an oligomer that is obtained by condensation of several hydroxycarboxylic acid monomers on themselves and for which a portion or all of the hydroxyl groups has/have been replaced by ester groups.

Another object of the invention relates to a particular process for manufacturing useful functionalized hydroxycarboxylic acid oligomers as adhesives, starting from hydrocarboxylic acids in the presence of a functional agent.

The functionalized hydroxycarboxylic acid oligomers that are obtained are also the object of the invention. Such molecules correspond to the following formula:

$$R\text{-}(\text{-}(M\text{-}R_2)_n)_x$$

With:
R representing a carbon-containing chain,
$R_2$ representing a reactive group, preferably OH or COOH,
x being an integer that is greater than or equal to 1, preferably between 1 and 10,
M representing a hydroxycarboxylic acid, and
n representing an integer of between 1 and 1,000.

Finally, a last object of the invention relates to adhesive products or adhesive compositions that also comprise functionalized hydroxycarboxylic acid oligomers.

Advantageously, this invention makes it possible to obtain molecules that have good effectiveness in terms of adhesion, while being degradable in a natural medium and not harmful to the environment.

Other characteristics and advantages will emerge from the following detailed description of the invention.

The object of this invention is therefore the use as adhesive of at least one functionalized hydroxycarboxylic acid oligomer that is obtained by at least one stage for polycondensation of a hydroxycarboxylic acid and a functional agent that is derived from an oil or a fat of natural origin. It can involve in particular a hydroxycarboxylic acid oligomer with at least one acid or hydroxyl group.

According to a preferred embodiment, the functionalized hydroxycarboxylic acid oligomer is a hydroxycarboxylic acid oligomer ester.

Preferably, it involves a functionalized hydroxycarboxylic acid oligomer that has a degree of polymerization of 1 to 1,000 with one or more hydroxyl group(s) or one or more acid group(s). Even more preferably, the degree of polymerization is between 1 and 100.

The acid groups are selected in a preferred manner from among:

The linear or branched saturated fatty acids, comprising between 6 to 32 carbon atoms, preferably between 12 and 20, such as stearic acid or palmitic acid, The linear or branched unsaturated fatty acids, comprising between 6 to 32 carbon atoms, preferably between 12 and 20, and between 1 and 10 unsaturations, such as linoleic acid or oleic acid.

The functionalized hydroxycarboxylic acid oligomer can be used as adhesive for bonding materials, in particular as an adhesive of lignocellulosic materials.

By way of example, the lignocellulosic materials can be selected from among:

Hard or soft woods such as beech, spruce, oak, poplar, or chestnut,
Hemp, flax, bamboo, cotton, and
Cellulose, hemicellulose, and lignin.

The functionalized oligomer according to the invention can be applied by itself directly on a material to be bonded, or integrated in a composition. The coated material of the functionalized oligomer is next brought into contact with another material, itself optionally also coated in advance. After drying between approximately 1 minute and 40 hours, the materials are bonded.

According to one variant, it can be combined with at least one polyisocyanate that is dispersed in advance in the oligomer during the application. Preferably, the molar ratio between the polyisocyanate(s) and the functionalized oligomer according to the invention is between 0.1 and 50%.

The polyisocyanates can be selected in particular from among methylene diphenyl diisocyanate (MDI), toluene diisocyanate (TDI), hexamethylene diisocyanate (HDI) and isophorone diisocyanate.

According to another aspect, the useful functionalized hydroxycarboxylic acid oligomers according to the invention can be obtained by a particular manufacturing process.

This process comprises at least one stage for polycondensation of at least one hydroxycarboxylic acid and at least one functional agent.

Functional agent is defined as a natural compound that has at least one reactive group, preferably between 1 and 10 reactive groups.

The functional agent is a derivative of an oil or a fat of natural origin (lipid-rich raw materials), i.e., a functional agent that is obtained from monoglycerides or diglycerides that are themselves obtained from triglycerides, primary components of vegetable oils and animal fats.

The vegetable oils in particular are actually oils with a high content of triglycerides or essentially consisting of ester triglycerides of fatty acid(s) and glycerol.

The vegetable oils and animal fats whose linear or branched, saturated or unsaturated fatty acids comprise 6 to 32 carbon atoms and optionally 0 to 10 unsaturations and 0 to 5 hydroxyl groups will be preferred.

Among the vegetable oils that are suitable for the invention, it is possible to cite oleic and erucic canola oils, flaxseed oil, sunflower oil, castor oil, soybean oil, palm oil, palm-kernel oil, coconut oil, corn oil, cottonseed oil, peanut oil, rice bran oil, olive oil, tung oil, and *Jatropha* oil (*Jatropha curcas*). *Jatropha* oil, extracted from mature seeds of *Jatropha curcas*, is a liquid oil at ambient temperature, of unsaturated type and with a predominance of oleic fatty acids (43-53%), linoleic fatty acids (20-32%), and palmitic fatty acids (13-15%).

Other sources of natural triglycerides are also usable, such as fish oils, micro- and macro-algae oils, tallow oils, and tall oils.

Fatty alcohols can also be used as functional agents.

In a preferred manner, oils that have fatty acids that comprise between 12 and 20 carbon atoms and more ideally C18-rich fatty acids, such as oleic acid, linoleic acid or linolenic acid, will be selected.

In a preferred manner, this involves a polyacid or polyol acid or hydroxyl functional agent, i.e., a functional agent whose reactive group(s) are acid or hydroxyl groups.

The molar ratio of functional agent to hydroxycarboxylic acid is preferably between 0.01 and 50%.

According to a particularly suitable embodiment, the process according to the invention consists in polycondensing at least one hydroxycarboxylic acid by direct dehydration in the presence of a hydroxyl-containing compound or acid for forming a functionalized oligomer.

The reaction that occurs can be shown as follows:

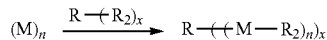

With:
M representing a hydroxycarboxylic acid,
n representing an integer between 1 and 1,000,
R—(—R$_2$)$_x$ representing the functionalized agent,
R representing a carbon-containing chain,
R$_2$ representing a reactive group, preferably OH or COOH, and
x representing an integer ≥1, preferably between 1 and 10.

According to a particular embodiment of the invention, the hydroxycarboxylic acid is lactic acid or glycolic acid.

Preferably, polycondensation is carried out under vacuum at high temperature, i.e.:
A pressure of between 1 and 900 mbar, more particularly between 20 and 600 mbar, and
A temperature of between 70 and 240° C., more particularly between 140 and 200° C.

Polycondensation can be carried out in the presence of one or more catalysts, which make it possible in particular to increase the speed of the reaction. Among the catalysts that can be used for this invention, it is possible to cite in particular sulfuric acid or metals of groups I, II, III and IV of the periodic table, or salts that are based on these metals. In particular, it is possible to cite tin octoate, tin dichloride, titanium butoxide, titanium isopropoxide, tin oxide, antimony oxide, dibutyltin dilaurate, and zirconium acetylacetonate.

The functionalized oligomers that are obtained according to the invention are biodegradable and have a mean molar weight that is in a low number of between 200 and 10,000 g/mol.

They also have a low polydispersity index, i.e., between 1 and 2, and are amorphous (with a glass transition temperature of between 30 and 70° C.).

The functionalized oligomers that can be obtained by the process according to the invention can be represented by the following formula:

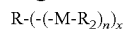

With:
R representing a carbon-containing chain,
R$_2$ representing a reactive group, preferably OH or COOH,
x being an integer that is greater than or equal to 1, preferably between 1 and 10,
M representing a hydroxycarboxylic acid, and
n representing an integer of between 1 and 1,000.

Examples of particularly suitable oligomers are shown below.

EXAMPLE 1

Stearic Acid on which 10 Lactic Acid Molecules are Grafted

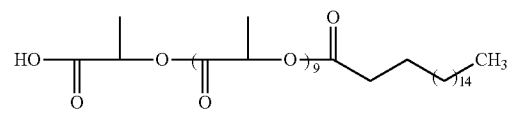

EXAMPLE 2

Oleic Acid on which 10 Lactic Acid Molecules are Grafted

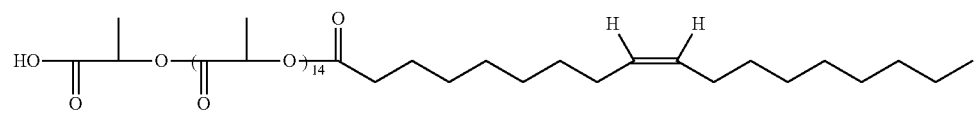

The functionalized hydroxycarboxylic acid oligomers can be integrated into compositions or products that are designed for the bonding of materials, in particular for the bonding of lignocellulosic materials.

These adhesive compositions comprise between 10 and 100% functionalized hydroxycarboxylic acid oligomers, preferably between 20 and 90%.

These compositions can also contain a polyisocyanate that is dispersed into the oligomer. The molar ratio between the polyisocyanate and the functionalized oligomer is preferably between 0.1 and 50%.

By way of example, the polyisocyanates can be selected from among methylene diphenyl diisocyanate (MDI), toluene diisocyanate (TDI), hexamethylene diisocyanate (HDI), and isophorone diisocyanate.

The adhesive compositions according to the invention can also comprise other adjuvants and other bonding agents.

Advantageously, the functionalized hydroxycarboxylic acid oligomers have good adhesion qualities, comparable to those of the existing synthetic glues.

These characteristics can be illustrated by the following example, produced with L-lactic acid as a hydroxycarboxylic acid and with ricinoleic acid that is obtained from castor oil as a functionalized agent.

For this example, the tensile stress characteristics are determined according to the recommendations that are described in the International Standard ISO/R 527 (determination of tensile stress characteristics). The tests have therefore been implemented under well-defined conditions of temperature, moisture, and speed of separation of the jaws. The tensile strength test consists in imposing an elongation on a specimen with an initial cross-section $S_o$ and a useful length $L_o$. The specimen is embedded at its two ends in jaws. One of these movable jaws is connected to a system for driving at a linear displacement speed. The measurement of the forces is done using an electronic force sensor (10 kN).

The information noted from these tests is:
The maximum tensile strength constraint in MPa,
The elongation at break in %,
Young's Modulus of tensile strength in MPa.
The operating procedure is the following.

A flask that contains a mixture of L-lactic acid, ricinoleic acid (at 6.66 mol % relative to the lactic acid), and tin octoate (at 1% by mass of the total mass) is heated between 160 and 190° C., and it is connected to a rotary evaporator. The assembly is placed under reduced pressure so as to eliminate the water that is produced by the condensation reactions. At t=0, the mixture is placed at 800 mbar. After one hour, the pressure is gradually decreased to 25 mbar. The reaction is stopped after 9.5 hours, and the following are recovered:
Water,
Lactide in the form of white crystals distributed over the walls of the assembly (between 0.01 and 0.1% of the initial mixture by mass), and
An oligomer according to the invention that is denoted AlRic15.

The oligomer that is obtained has the following characteristics:
It is amorphous with a glass transition temperature of 45° C., and
It has an acid index of 74 mg of KOH/g (according to the Standard NF T 60-204).

A piece of floorboard (6 by 6 by 0.9 cm$^3$) is coated over one of the thicknesses by a certain quantity of oligomer that is obtained, and then it is brought into contact by the coated side with a piece that is identical to the floorboard.

The unit is placed on a compression/tensile strength device. In a first step, the two pieces undergo compression (30 seconds, 1 MPa of compression force, and 1.8 mm/minute of compression speed) followed by tensile strength (with a tensile strength rate of 5 mm/minute). The tensile strength characteristics are thus determined and have been compared to those obtained with synthetic commercial glues (wood glue, Araldite® glue, and neoprene glue). The results are presented below.

| Nature of the Glue | Maximum Constraint (MPa) | Elongation at Break (%) | Young's Modulus of Tensile Strength (MPa) |
|---|---|---|---|
| AlRic15 | 0.04 | 0.45 | 5.5 |
| Wood Glue | 0.12 | 2.3 | 14 |
| Araldite ® Glue | 0.03 | 0.15 | 0.5 |
| Neoprene Glue | 0.04 | 2.95 | 2 |

It is noted that the necessary force for separating the two pieces of wood bonded with the functionalized oligomer according to the invention is identical to the one that is necessary for a commercial glue, in particular of the Araldite® type and neoprene.

These results clearly show that the functionalized hydroxycarboxylic acid oligomers play an adhesive role, while being obtained from renewable and biodegradable resources.

The invention claimed is:

1. A method for bonding materials, comprising steps of:
providing an adhesive comprising at least one functionalized hydroxycarboxylic acid oligomer that is obtained by at least one stage for polycondensation of a hydroxycarboxylic acid in the presence of a functional agent that is derived from an oil or a fat of natural origin; and
suitably applying the adhesive to the materials to be bonded.

2. The method according to claim 1, wherein the materials to be bonded are lignocellulosic materials.

3. The method according to claim 1, wherein the functionalized hydroxycarboxylic acid oligomer is a hydroxycarboxylic acid oligomer with at least one acid or hydroxyl group.

4. The method according to claim 1, wherein the functionalized hydroxycarboxylic acid oligomer is an esterified hydroxycarboxylic acid oligomer.

5. The method according to claim 1, wherein the adhesive further comprises at least one polyisocyanate.

6. A process for manufacturing a functionalized hydroxycarboxylic acid oligomer, comprising a step of carrying out polycondensation of a hydroxycarboxylic acid in the presence of a functional agent that is derived from an oil or a fat of natural origin.

7. The process according to claim 6, wherein the functional agent is an acid or hydroxyl functional agent.

8. The process according to claim 6, wherein the polycondensation is carried out in the presence of a catalyst.

9. The process according to claim 6, wherein the polycondensation is carried out at a pressure of between 1 and 900 mbar and at a temperature of between 70 and 140° C.

10. The process according to claim 6, wherein the polycondensation is carried out by direct dehydration in the presence of a hydroxyl-containing compound or acid.

11. The process according to claim 6, wherein the molar ratio of functional agent to hydroxycarboxylic acid is between 0.01 and 50%.

12. The method according to claim 2, wherein the functionalized hydroxycarboxylic acid oligomer is a hydroxycarboxylic acid oligomer with at least one acid or hydroxyl group.

13. The method according to claim 1, wherein the functionalized hydroxycarboxylic acid oligomer is represented by the formula:

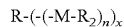

wherein:
- R represents a carbon-containing chain derived from said functional agent,
- $R_2$ represents a reactive group,
- x is an integer greater than or equal to 1,
- M represents a hydroxycarboxylic acid, and
- n is an integer greater than 1 and less than or equal to 1,000.

14. The method according to claim 13, wherein $R_2$ is OH or COOH.

15. The method according to claim 13, wherein x is between 1 and 10.

16. The method according to claim 1, wherein the adhesive comprises between 10 and 90% of the functionalized hydroxycarboxylic oligomer.

17. The method according to claim 1, wherein the functional agent is a fatty acid.

18. The method according to claim 1, wherein the oligomer has a degree of polymerization greater than 1 and less than or equal to 1000.

19. The method according to claim 1, wherein the functional agent is derived from a C12-C32 fatty acid.

* * * * *